United States Patent
Tien et al.

(10) Patent No.: US 9,442,195 B2
(45) Date of Patent: Sep. 13, 2016

(54) POWER EFFICIENT PULSED LASER DRIVER FOR TIME OF FLIGHT CAMERAS

(71) Applicant: Lumentum Operations LLC, Milpitas, CA (US)

(72) Inventors: An-Chun Tien, San Jose, CA (US); Lucas Morales, San Francisco, CA (US); Vincent V. Wong, Los Altos, CA (US)

(73) Assignee: Lumentum Operations LLC, Milpitas, CA (US)

( * ) Notice: Subject to any disclaimer, the term of this patent is extended or adjusted under 35 U.S.C. 154(b) by 365 days.

(21) Appl. No.: 14/051,986

(22) Filed: Oct. 11, 2013

(65) Prior Publication Data

US 2014/0104592 A1   Apr. 17, 2014

Related U.S. Application Data

(60) Provisional application No. 61/712,599, filed on Oct. 11, 2012.

(51) Int. Cl.
*G01C 3/08* (2006.01)
*G01S 17/08* (2006.01)
*G01S 17/89* (2006.01)
*G01S 7/491* (2006.01)

(52) U.S. Cl.
CPC .............. *G01S 17/08* (2013.01); *G01S 7/4911* (2013.01); *G01S 17/89* (2013.01)

(58) Field of Classification Search
CPC ....... G01S 17/08; G01S 7/4911; G01S 17/89
See application file for complete search history.

(56) References Cited

U.S. PATENT DOCUMENTS

| | | | |
|---|---|---|---|
| 4,297,017 A * | 10/1981 | Farmer | 396/166 |
| 5,734,285 A * | 3/1998 | Harvey | 327/291 |
| 2005/0046584 A1* | 3/2005 | Breed | 340/825.72 |
| 2009/0016201 A1* | 1/2009 | Kondo et al. | 369/124.04 |
| 2011/0205522 A1* | 8/2011 | Snow et al. | 356/5.01 |
| 2013/0236187 A1* | 9/2013 | Middleton et al. | 398/116 |

* cited by examiner

*Primary Examiner* — Luke Ratcliffe
*Assistant Examiner* — Samantha K Abraham
(74) *Attorney, Agent, or Firm* — Harrity & Harrity, LLP

(57) ABSTRACT

A time of flight camera device comprises an light source for illuminating an environment including an object with light of a first wavelength; an image sensor for measuring time the light has taken to travel from the light source to the object and back; optics for gathering reflected light from the object and imaging the environment onto the image sensor; driver electronics for controlling the light source with a high speed signal at a clock frequency; and a controller for calculating the distance between the object and the illumination unit. To minimize power consumption and resulting heat dissipation requirements, the light source/driver electronics are operated at their resonant frequency. Ideally, the driver electronics includes a reactance adjuster for changing a resonant frequency of the illumination unit and driver electronics system.

20 Claims, 5 Drawing Sheets

US 9,442,195 B2

POWER EFFICIENT PULSED LASER DRIVER FOR TIME OF FLIGHT CAMERAS

CROSS-REFERENCE TO RELATED APPLICATIONS

The present invention claims priority from U.S. Provisional Patent Application No. 61/712,599, filed Oct. 11, 2012, which is incorporated herein by reference.

TECHNICAL FIELD

The present invention relates to a pulsed laser driver, and in particular to a pulsed laser driver for a time of flight camera.

BACKGROUND OF THE INVENTION

Time of flight (ToF) camera systems have become extremely popular in interactive video games, and are now becoming more popular in many other aspects of modern life, including communication, art, security and electronic controls. As technology evolves and expands into other fields, the desire to shrink both the size and cost of the ToF system increases. Power consumption and heat dissipation are also major concerns, in particular because the more power required, the larger the heat sink required, the larger the overall footprint required.

An object of the present invention is to overcome the shortcomings of the prior art by providing a time of flight system requiring less power and less heat dissipation.

SUMMARY OF THE INVENTION

Accordingly, the present invention relates to a method of operating a time of flight camera comprising:

illuminating an environment, including an object, with light of a first wavelength from a light source;

controlling the light source with a high speed signal at a clock frequency using driver electronics;

selecting the clock frequency, whereby the light source and driver electronics system is at resonance;

gathering reflected light and imaging the environment onto an image sensor; and calculating the distance between the object and the light source using a controller.

Another aspect of the present invention relates to a time of flight camera device comprising:

a light source for illuminating an environment including an object with light of a first wavelength;

an image sensor for measuring time the light has taken to travel from the light source to the object and back;

optics for gathering reflected light from the object and imaging the environment onto the image sensor;

driver electronics for controlling the light source with a high speed signal at a clock frequency, whereby the light source and driver electronics system is at resonance; and a controller for calculating the distance between the object and the illumination unit.

BRIEF DESCRIPTION OF THE DRAWINGS

The invention will be described in greater detail with reference to the accompanying drawings which represent preferred embodiments thereof, wherein.

DETAILED DESCRIPTION

Figure 1:
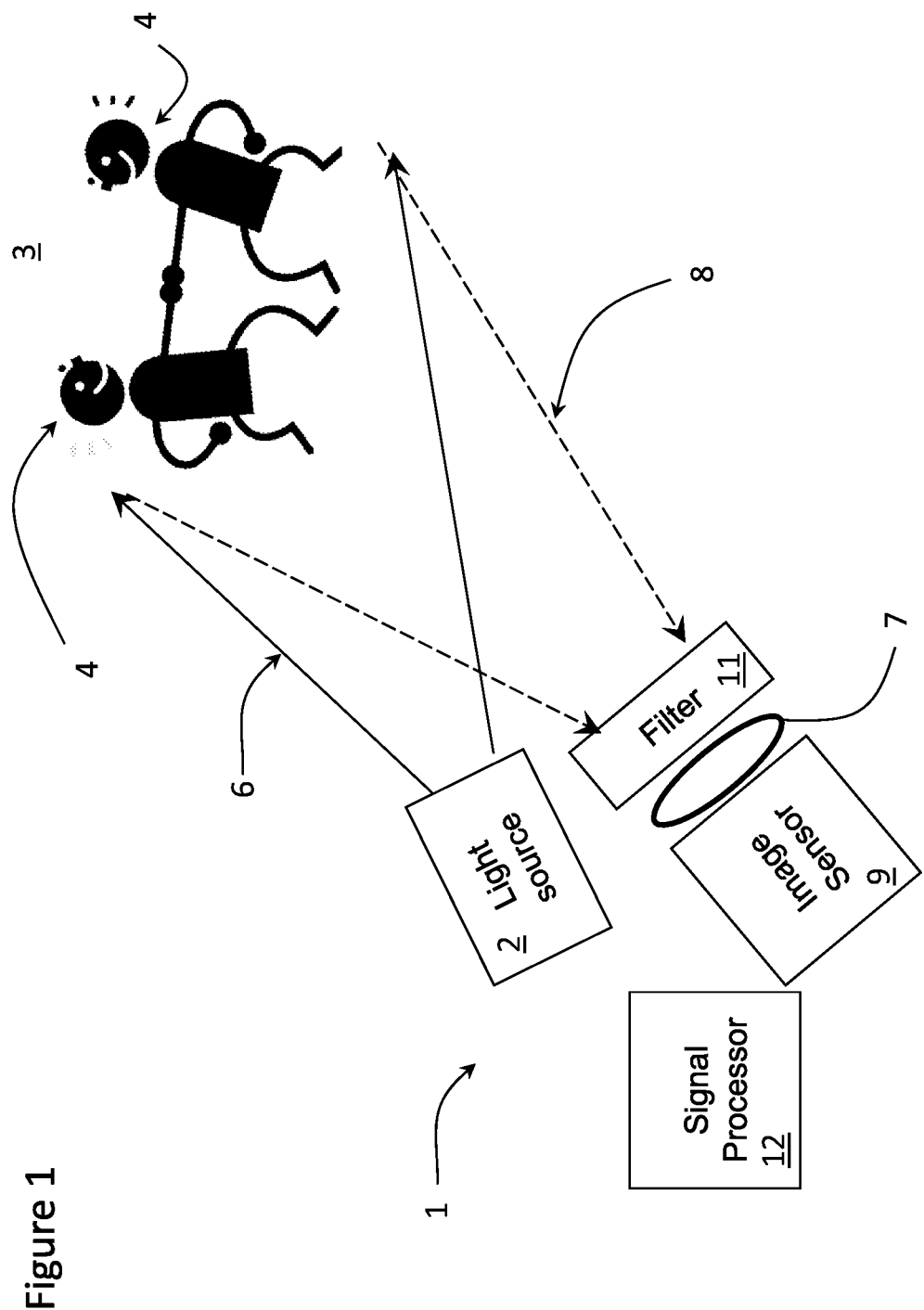
FIG. 1 is a schematic diagram of a time of flight system in accordance with the present invention.

With reference to FIG. 1, a time-of-flight (TOF) camera system 1 according to the present invention includes a light source 2 for illuminating a scene 3 with one or more moving users 4 with a beam of light 6. Since the light 6 has to be modulated with high speeds, e.g. 20 MHz up to 200 MHz, typically only LEDs or laser diodes are feasible; however, the light source 2 may be an LED, a laser, a fiber laser, or other appropriate source. The modulation may be analog or digital or both. The light source 2 normally uses infrared light to make the illumination unobtrusive to the users 4. The light beam 6 may also pass through optical devices, such as lenses, optical diffusers, optical beam shapers. The devices can be either diffractive or refractive, or both, for generating patterns, e.g. lines, arrays of spots, etc, and/or for moving the patterns across the scene.

A lens 7 or other suitable optics gathers light 8 reflected from the scene 3, and images the scene 3 onto an image sensor 9. An optical band pass filter 11 reflects light at other wavelengths and only passes the reflected light 8 with the same wavelength as the light source 2, which suppresses background light from interfering with the image sensor 9.

The image sensor 9 is the heart of the TOF camera system 1, and may comprise a CCD array, a silicon sensor array or a single photodetector, which utilizes another scanning device, such as a MEMS.

Each pixel on the image sensor 9 measures the time the light 6 has taken to travel from the light source 2 to the users 4 in the scene 3 and back to the image sensor 9 to determine the location and motion of the one or more users 4 in the scene 3.

Several different approaches can be used for timing, such as by using RF-modulated light sources 2 with phase detectors for modulating the outgoing beam 6 with an RF carrier at modulation frequency $f_{modulation}$, then measuring the phase shift $\phi$(transmitted, received) of that carrier on the receive side with the image sensor 9.

Time-of-flight (ToF) camera: range finding by phase detection $$D = \phi(\text{transmitted, received})/(2\pi) * (c/f_{modulation})/2$$

Both the light source 2 and the image sensor 9 are controlled by high speed signals from a signal processor 12. These signals have to be very accurate to obtain a high resolution. For example, if the signals between the light source 2 and the image sensor 9 shift by only ten picoseconds, the distance changes by 1.5 mm. For comparison: current CPUs reach frequencies of up to 3 GHz, corresponding to clock cycles of about 300 ps—the corresponding 'resolution' is 45 mm. It is common practice for phase detection to achieve sub-clock-cycle resolution. The typical modulation frequency for ToF based Gesture Recognition applications is on the order of 10 MHz to 100 MHz, which correspond to a quite large (meters) round-trip distance per clock cycle. Because of the sub-cycle resolution by phase detection, millimeter resolution can be achieved.

The distance to the one or more users 4 is calculated directly by the signal processor 12, typically in the form of suitable hardware and software stored in non-transitory memory in the TOF camera system 1; however, to obtain better performance, some calibration data can also be used. Due to the imperfection of the light pulse shape and other reasons, the true phase delay could deviate from the phase delay deviated from the phase detection circuitry. A calibration process conducted by the signal processor 12 utilizes a look-up table stored in non-volatile memory comprising data of the true object distance vs. the measured phase delay. Since the look-up take is built from a set of finite number of data points, the distance can be calculated by either data interpolation or best-fit function. The camera 1 then provides a distance image over a USB or Ethernet interface to a host computer system, such as a computer game console.

Figure 2:
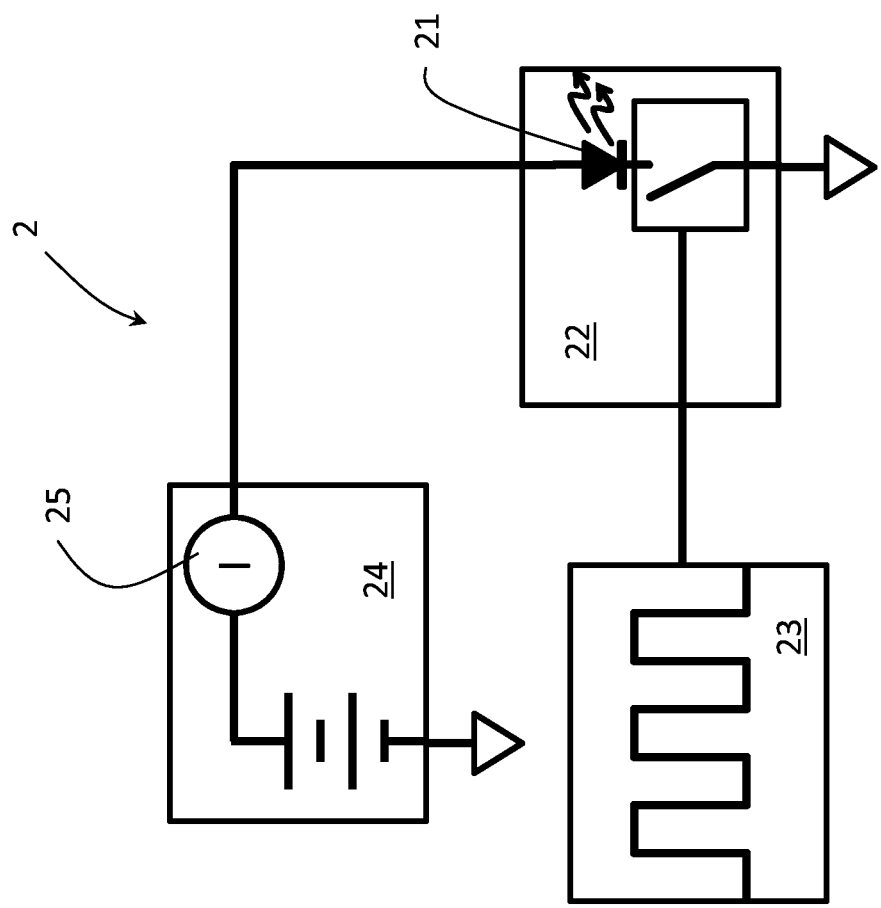
FIG. 2 is a schematic diagram of the light source of FIG. 1.

With reference to FIG. 2, the light source 2 includes a laser 21 driven by a laser driver 22, which is controlled by a clock generator 23 and powered by a power supply 24. In principle, any clock signal waveform works for the laser 21, i.e. it is not necessary to use square (top hat) pulses. Accordingly, a sine-wave driven by reactive components, e.g. inductive elements L and capacitive elements C, with a net average power=0, can be used for the clock signal from the clock generator 23. The waveform, i.e. pulse shape, pulse width and pulse repetition frequency, of the clock signal pulse train can be optimized for power efficiency of the laser driver 22 and the laser 21.

The absolute pulse shape isn't important to achieve good phase-based depth measurement, so it is a good trade-off to get better power efficiency than trying to get a fast rise time and fall time. The method of the present invention makes the laser driver 22 and the laser 21 generate less heat, which means the size for the heat spreader can be smaller.

According to the present invention, the driver-and-laser system is the most efficient when the system is at resonance. In a system comprised of linear components, e.g. resistance, inductance and capacitance, only the waveform for resonance is sinusoidal. However, a laser diode is not a linear device. For a given design of the laser driver 22, e.g. fixed rise time and fall time, the $f_{modulation}$ of the clock generator 23 can be adjusted to find the resonant frequency of the system, and thereby minimize power consumption. Moreover, the resonance frequency of the laser system can be adjusted by adjusting or changing the reactance, e.g. L and/or C, to ensure a resonant frequency is attainable, thereby producing less heat, i.e. a lower temperature rise.

Figure 3:
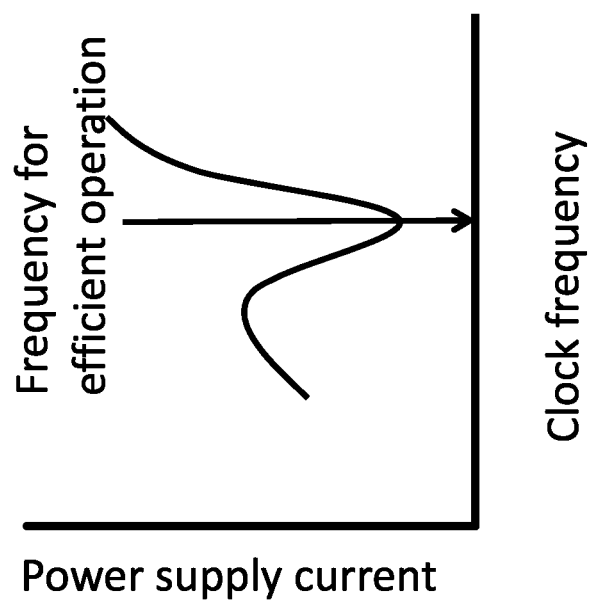
FIG. 3 is a plot of Power Supply Current vs Clock Frequency for the light source of FIG. 2.

With an existing pulsed laser driver 22, with which the rise time and fall time of the pulses are not easily adjustable, waveform optimization for high power efficiency to find the resonance condition can be done by the following steps:

Connect the laser 21 to the laser driver 22 and a power supply 24;

Scan the frequency of the clock generator 23 across the desired operating range, e.g. 20 MHz to 200 MHz;

Measure the power required, i.e. current from power source 23, using ammeter 25;

Plot the current versus clock frequency curve (See FIG. 3);

Find the minimum of the curve in the desired frequency range;

Use the frequency located at the minimum as the laser modulation frequency $f_{modulation}$.

The minimum corresponds to the least power consumption frequency within the desired operating frequency range.

For best results the duty cycle is kept around 50%. Here the duty cycle is defined as the pulse width to pulse period ratio, and the pulse width is defined as the full width at half maximum. The reason for keeping the duty cycle around 50% is to ensure the least amount of harmonics of the modulation frequency.

Ideally, adjustment of the pulse repetition frequency is started from a low frequency, in other words at the low end of the operating frequency range, which is typically 20 MHz to 200 MHz. As the frequency increases, the total electrical power supplied to the laser driver 22 and laser 21 will increase at first. Then, the total supplied electrical power will start to decrease when the modulation frequency approaches the resonant frequency of the system. The frequency at which the minimal supplied electrical power to the laser driver 22 is the optimal operating frequency for the laser driver 22. During the pulse repetition frequency adjustment, the optical power, i.e. either the peak power or the average power, should be maintained at a desired level, and the duty cycle needs to be kept at a constant (see Step 1).

The resonant frequency is determined by the reactive components, e.g. inductance and capacitance, in the system, including the parasitic inductance and parasitic capacitance. If no resonance is observed in the second step described above, it means the resonant frequency is outside of the practical frequency range for the application. To ensure that a resonant frequency is within the operating wavelength range, variable reactive components or multiple reactive component can be provided in the system to shift the resonant frequency.

A system can be designed for multi-frequency resonance by using a switch to select between different sets of reactive components in the system, which result in different resonant frequencies. The switching can be done initially during the original manufacturing or by the customer to suite their specifications. The switching can be done manually or controlled by the signal processor 12. Typically, the switching is done on a circuit board in the signal processor 12, by the customer or end user.

Figure 4:
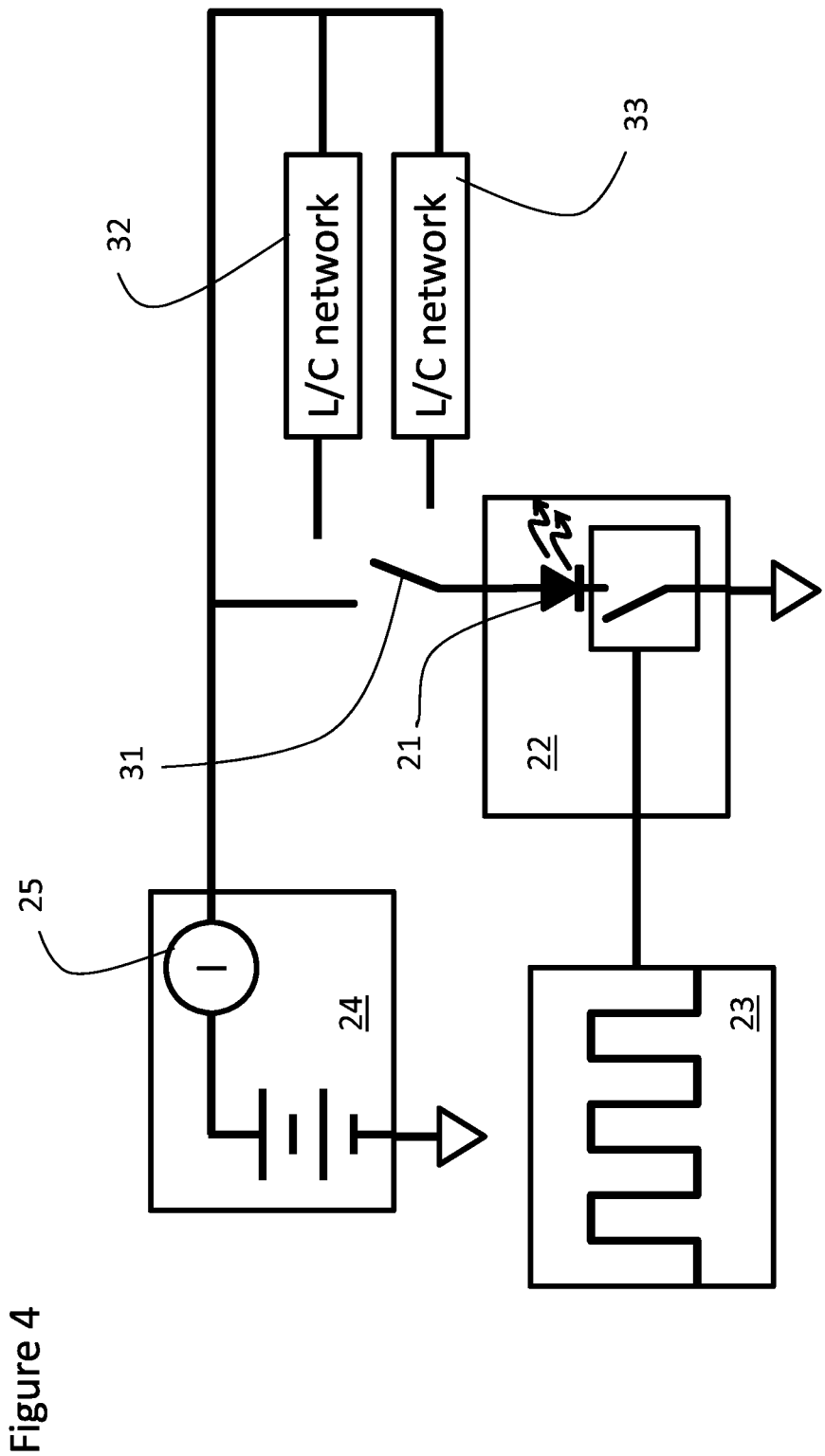
FIG. 4 is a schematic diagram of an alternate embodiment of the light source of FIG. 2.

FIG. 4 is an example for the multi-frequency system in which a switch 31 is provided for selecting between the inherent reactants or one of a plurality of different reactant networks, e.g. first network 32 and second network 33, with different inductances and capacitances, which results in different resonant frequencies. Please note that the placement of the reactant networks 32 and 33 is not limited to between the laser 21 and the power supply 24, as illustrated in FIG. 4. For instance, the reactant networks 32 and 33 can be: parallel to the laser 21, between the laser's cathode and ground, between the laser's anode and ground, or in general, between either node (anode or cathode) of the laser and any other node in the circuit.

The reactant network can be as simple as an inductor, as simple as a capacitor, an inductor and a capacitor either in series or in parallel or other combinations of single or multiple inductors and single or multiple capacitors. Ideally, the reactant networks 32 and 33 are only made out of reactive components (inductor and capacitor). The reason is that any resistive component in the network dissipates electricity, which is not desirable. Also, the reactant networks 32 and 33 can be replaced with designs comprising active components (transistors, operational amplifiers, etc.)

Figure 5:
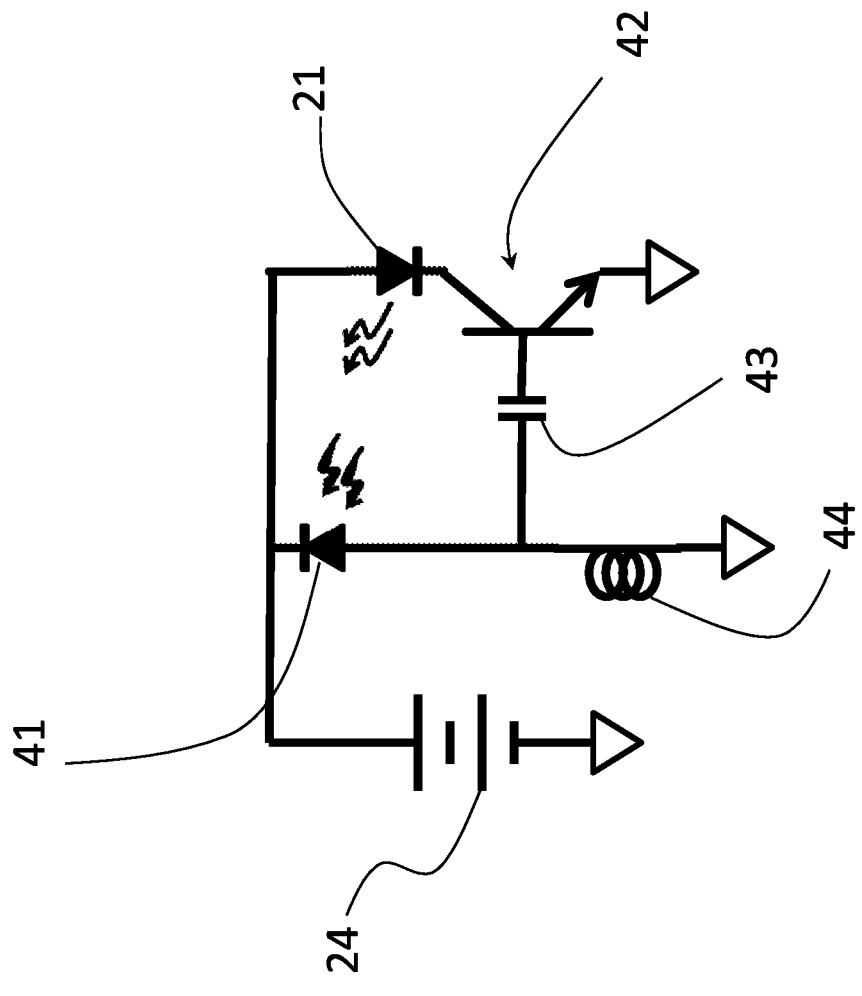
FIG. 5 is a schematic diagram of an alternate embodiment of the laser driver circuit, in the form of a self-oscillating laser driver for the light source of FIG. 2.

With reference to FIG. 5, another embodiment of the present invention provides a circuit for driving the laser 21 at a particular form of resonance, i.e. relaxation resonance oscillation. This circuit is a self-oscillating laser driver, as opposed to drivers that require an external clock to set the modulation frequency. At the relaxation oscillation frequency, the laser 21 emits more power with the same amplitude of the driving current.

The circuit initially starts from any noise in the system, and the intensity of the laser 21 increases. A photodetector 41 picks up light from the laser 21, generating an electrical signal with an AC and a DC component. The AC component of the photodetector 41 signal provides feedback to a transistor (or an amplifier) 42, which is in series with the laser 21. A bipolar junction transistor (BJT) with a base, a collector and an emitter is illustrated, but any suitable semiconductor transistor would suffice. A capacitor 43 is provided between the photodetector 41 and the transistor 42 to block the DC component from the transistor 42. An inductor 44 is provided to provide a DC bias for the photodetector 41.

An increase in the laser light makes the photodetector 41 produce more current at the base of the transistor 42. More base current means more collector current, hence more current to the laser 21 leading to more laser light. The feedback is "positive" when the frequency is at the relaxation resonance and the AC frequency component in the electrical signal from the photodetector 41 keeps feeding back positively to the transistor 42 and sustains the oscillation. Any signal component with a frequency other than the relaxation oscillation frequency (or the resonance frequency) does not meet the positive feedback condition and will not survive.

Eventually, the collector current saturates due to the limitations of the bias and circuit elements. Accordingly, the intensity of the laser 21 has to fall, because a constant laser current would make the photodetector 41 produce a constant current with no AC component through the capacitor 43 to the base of the transistor 42. A decrease in the laser light intensity results in a decrease in current from the photodetector 41, and consequently a decrease in the base current and a decrease in the laser light intensity. This process repeats itself at the resonance relaxation frequency, since the gain, i.e. laser power to drive current, is the highest at this frequency.

We claim:

1. A method of operating a time of flight camera comprising:
    selecting, by the time of flight camera, a clock frequency such that a light source and driver electronics operate at a resonant frequency, the clock frequency being selected by:
        scanning the clock frequency across a particular operating range,
        measuring a particular amount of required current,
        identifying, based on scanning the clock frequency and measuring the particular amount of required current, a particular frequency, and
        using the particular frequency as the clock frequency;
    controlling, by the time of flight camera and using the driver electronics, the light source with a high speed signal at the clock frequency;
    illuminating, by the time of flight camera and based on controlling the light source, an environment, including an object, with light from the light source;
    gathering, by the time of flight camera and based on illuminating the environment, reflected light and imaging the environment onto an image sensor; and
    calculating, by the time of flight camera and based on gathering the reflected light, a distance between the object and the light source.

2. The method according to claim 1, wherein the light is modulated at between 20 MHz to 200 MHz.

3. The method according to claim 1, wherein the light source comprises an LED or a laser diode.

4. The method according to claim 1, wherein the light source generates infrared light.

5. The method according to claim 1, further comprising:
    an optical band pass filter for passing the light and suppressing background light.

6. The method according to claim 1, wherein
    the light source comprises RF-modulated light sources with phase detectors by modulating an outgoing beam with an RF carrier, and
    the method further includes:
        measuring a phase shift of the RF carrier at the image sensor.

7. The method according to claim 1, wherein
    the particular frequency occurs at a point of minimum power required.

8. The method according to claim 1, further comprising:
    adjusting the resonant frequency of the light source and driver electronics system.

9. The method according to claim 8, wherein adjusting the resonant frequency includes:
    selecting between one of a plurality of reactant component networks to communicatively couple to the driver electronics.

10. The method according to claim 1, wherein the resonant frequency is a relaxation resonant frequency.

11. The method according to claim 1, further comprising:
    providing a transistor, including a base and a collector, in series with the light source,
    providing a photodetector, in parallel with the light source, for receiving a portion of the light from the light source and generating an AC electrical component; and
    feeding back the AC electrical component to the base of the transistor.

12. A time of flight camera device comprising:
    a light source for illuminating an environment including an object with light;
    an image sensor for measuring a time the light has taken to travel from the light source to the object and back;
    optics for gathering reflected light from the object and imaging the environment onto the image sensor;
    driver electronics for controlling the light source with a high speed signal at a clock frequency, whereby the light source and the driver electronics operate at a resonant frequency, the clock frequency being selected by:
        scanning the clock frequency across a particular operating range,
        measuring a particular amount of required current,
        identifying, based on scanning the clock frequency and measuring the particular amount of required current, a particular frequency, and
        using the particular frequency as the clock frequency; and
    a controller for calculating a distance between the object and the light source.

13. The time of flight camera device according to claim 12, wherein the driver electronics includes a reactance adjuster for changing the resonant frequency of the light source and the driver electronics.

14. The time of flight camera device according to claim 13, wherein the reactance adjuster includes a plurality of network segments, each with different reactance, and a switch for selecting one of the plurality of network segments.

15. The time of flight camera device according to claim 14, wherein each network segment, of the plurality of network segments, includes a capacitor with a different capacitance.

16. The time of flight camera device according to claim 14, wherein each network segment, of the plurality of network segments, includes an inductor with a different inductance.

17. The time of flight camera device according to claim 12, wherein the clock frequency is between 20 MHz and 200 MHz.

18. The time of flight camera device according to claim 12, wherein
the light source comprises an RF-modulated light source with phase detectors by modulating an outgoing beam with an RF carrier, and
the controller measures a phase shift of the RF carrier at the image sensor.

19. The time of flight camera device according to claim 12, wherein
the resonant frequency is a relaxation resonant frequency; and
the time of flight camera device further includes:
a feedback circuit for driving the light source at the relaxation resonant frequency.

20. The time of flight camera device according to claim 19, wherein the feedback circuit comprises:
a transistor, including a base, in series with the light source; and
a photodetector, in parallel with the light source, for receiving a portion of the light from the light source and generating an AC electrical component for feeding back to the base of the transistor.

* * * * *